Patented Mar. 15, 1938

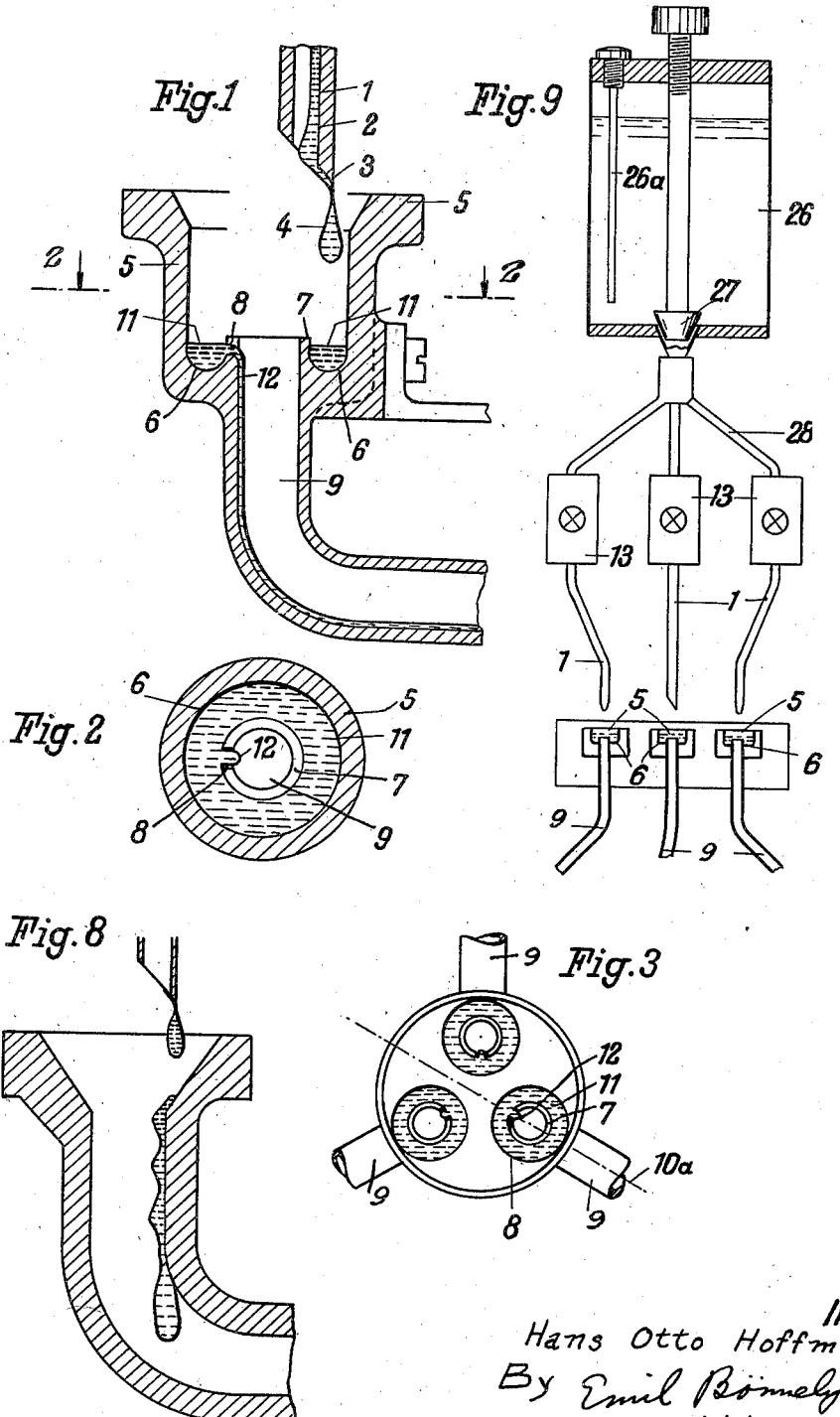

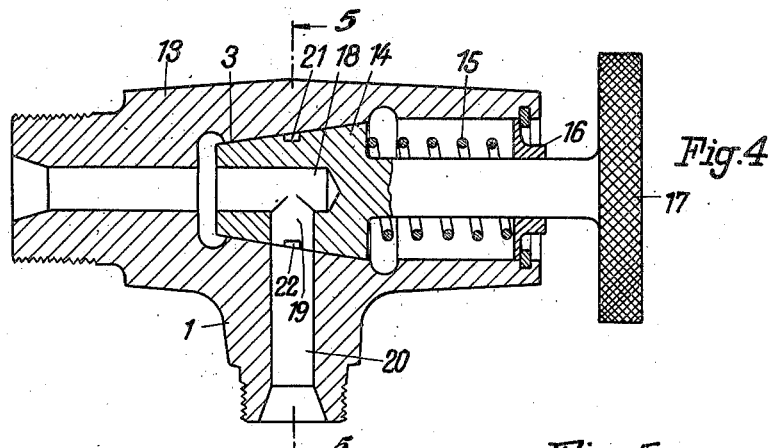
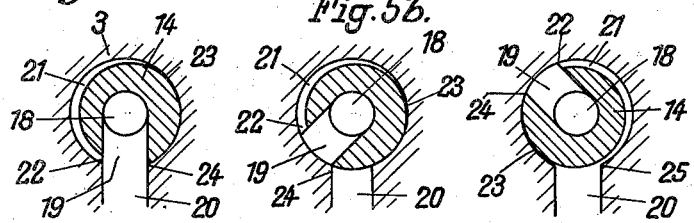
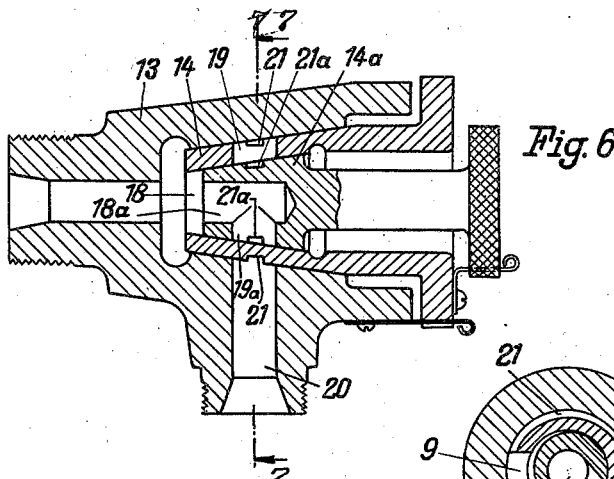
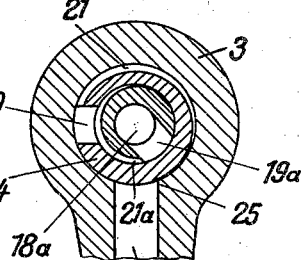

2,111,287

UNITED STATES PATENT OFFICE 2,111,287

APPARATUS FOR LUBRICATION, AS APPLIED IN PARTICULAR TO THE LUBRICATION OF AUTOMATIC CASTING MACHINES

Hans Otto Hoffmann, Zurich, Switzerland

Application July 23, 1936, Serial No. 92,216
In Great Britain July 31, 1935

12 Claims. (Cl. 184—1)

This invention relates to apparatus for lubricating parts exposed to high temperatures which is particularly applicable to the lubrication of automatic casting machines.

In casting machines it is of especial importance that the continuously hot casting matrices and especially their movable parts be lubricated with exactly measured quantities of lubricant in order to prevent constant burning, sticking of the type or dirtying up. Since the places to be lubricated generally lie more or less deeply in the interior of the machine, surface lubrication as a rule does not come into question. The lubricant has to be conducted to the places to be lubricated through tubes which very often have to be curved. Whether desirable or not these tubes have generally to serve also for leading off waste gases such as those produced by the evaporation of the lubricant, vapour produced at the casting place or the cooling air which has reached the casting place. Since the interior diameter of these tubes must be small in the interest of economy of space and to make it possible to lead them down to the casting places there is the possibility that these tubes may become obstructed by the lubricant flowing down whereby the escape of the gases is prevented, or that the inflow of the lubricant through the tubes and its passage to the place to be lubricated may be rendered impossible by the gases which often blow out with considerable force.

Every impediment and even small changes in the quantity of lubricant flowing in, however, are very disadvantageous because continuous burning or sticking of the type occurs, and because of the possibility of smearing over of the type occurring owing to the adhesion of lubricant. Similar disturbances can also occur if the inflow pipe for the lubricant has been closed for some reason or other and then when reopened again feeds the lubricant to the place to be lubricated either in too little or too great a quantity on account of inexact fine adjustment.

An object of this invention is to overcome these disadvantages.

According to the invention there is provided an apparatus for lubricating parts exposed to high temperatures particularly in automatic casting machines so that the lubricants arrive at the parts to be lubricated in the form of continuous threads on the inner walls of lubricating tubes of the kind in which the lubricants flow from heatable supply tanks, which are provided with stop valve devices, to delicately adjustable valves, which regulate exactly the rate of dropping of the lubricant, characterized in that the lubricant drops from the delicately adjustable valves into collecting or regulating containers which are provided with channels for overflow or outlet, said channels being disposed at the entrance to or in the path of the lubricating tubes which conduct the lubricant to the places to be lubricated.

An embodiment of apparatus according to the invention will now be described with reference to the accompanying drawings in which:—

Figure 1 shows a vertical section through a collecting and regulating container with its feeding arrangement situated at the end of a tube which serves to introduce the lubricant and to lead off the waste gases in an automatic casting machine.

Figure 2 is a cross-section through the said container taken on the line 2—2 in the direction of the arrows.

Figure 3 is a top view showing several collecting containers arranged in parallel.

Figure 4 is a vertical section through a finely regulating valve by which the collecting and regulating container is fed.

Figures 5a, 5b and 5c are cross-sections through the delicate regulating valve showing different positions taken on line 5—5 of Figure 4 in the direction of the arrows.

Figure 6 is a vertical section through a double action delicate regulating valve.

Figure 7 is a cross-section through the valve taken on line 7—7 of Figure 6 in the direction of the arrows with the parts in different adjustment.

Figure 8 is a sectional view showing a known type of construction.

Figure 9 shows diagrammatically a complete apparatus suitable for carrying out the lubrication of the casting parts of a casting machine.

Referring to Figures 1, 2 and 3, 1 is the tube feeding the lubricant from the delicate regulating valve, which feeds the lubricant 2 in such a way that it falls from the point 3 periodically in the form of drops 4. Under the feed tube 1 there is a collecting and regulating container 5 arranged eccentrically to the feed tube 1, having at the bottom a collecting channel 6 with an inner rim 7. In the rim 7 an outlet opening 8 is provided. To the rim 7 of the collecting channel 6 there is attached the lubricating tube 9. The eccentric position of the feed pipe 1 is so arranged that the periodically falling drops of lubricant 4 fall into the collecting channel 6 of the collecting and regulating container 5, until such time as the surface 11 of the lubricant reaches the outlet opening 8 in the rim 7. After the collected lubricant passes through the outlet opening 8 it flows in the form of an unbroken oil thread 12 in the lubricating tube 9, which is of the required length. The outlet opening 8 must be so arranged at the circumference of the inner rim 7 and in connection with the lubricating tube 9 which has a bend therein that the oil thread 12 always lies on the inner surface of the tube 9 remote from the centre of curvature and therefore does not break up into drops, which would prevent the outflow of gas or air streaming in the opposite direction. Now, gas or air flowing out can pass through the lubricating tube 9 without any effect on the lubrication, i. e. without stemming the oil thread 12, and leave through the upper opening in the container 5. Having the above requirement in mind the depth of the collecting channel 6 and its relation to the outflow opening 8 in the rim 7 can be determined as required so that, for example, after a very few drops have fallen the lubricating thread 12 flows into the lubricating tube 9. Likewise by deepening the collecting channel 6 and making the outflow opening 8 higher in the rim 7, the collection of a larger amount of lubricant can be brought about before it overflows and the lubricant thread 12 is formed.

Further, several containers 5 can be arranged in parallel, the corresponding lubricant feed tubes 1 each being arranged eccentrically with respect to the corresponding container, as well as the necessary connections to the corresponding lubricating tubes 9 in which connection care must again be taken for the correct arrangement of the outflow opening in the channel of the central plane 10a (Fig. 3) to correspond with the bend which follows in the lubricating tube.

Referring to Figures 4 to 7 of the drawings which illustrate the delicate regulating valve by means of which the channel 6 of the container 5 is fed through the tube 1 eccentrically disposed with respect thereto (Figure 1). In the housing 13 a cylindrical or cone-shaped plug 14 is disposed and held tight in known manner by means of a spring 15 and a cover plate 16, and is controlled by means of the knob 17. The plug 14 is provided with an axial bore 18 and is therefore hollow so that the oil can flow through the bore 18 in the valve which has a large transverse bore 19 with a large interior diameter corresponding to the cross-section of the connecting tube 20. At the transverse bore 19 of the hollow plug 14, directly connected and in connection therewith, a delicate regulating groove 21 of diminishing cross-section is cut (either on the circumference of the plug itself or else in the plug-seating of the housing 3), which has its greatest cross-section at the point of direct connection 22 and then diminishes in cross-section progressively or according to determined amounts for special porposes to zero at 23, only however to such an extent as the circumference of the plug or plug-seating allows, so that between the zero point 23 of the regulating groove 21 and the limit of the bore 24 of the maximum flow passage 19 of the hollow plug 14, sufficient solid wall remains so that the flow can be cut off. All the flow passages are arranged in the plug as well as in the housing so that the liquid to be regulated does not come into contact with the tightening device consisting of the spring 15 and the cover plate 16.

Figure 5a shows the position of the valve for the purpose of washing through or emptying. The bore 19 in the hollow plug 14 opens the passage to the full extent of the cross-section of the connecting tube 20 and therefore allows the passage of the medium with the full original stream velocity.

Figure 5b shows the valve completely closed. By further turning the plug the solid wall 23—24 is brought in front of the connecting tube 20 and the connection between the tube and the hollow plug is closed.

Figure 5a shows the position of the regulation. The medium coming through the hollow plug 14 flows through the bore 19 by way of 22 into the delicate regulating groove 21 and at 25 reaches the connecting pipe 20 and only with exactly the quantity which corresponds with the cross-section 25 occurring in the regulating groove 21.

It is only necessary to have one conduit in the valve casing in the plane of the groove, the other conduit being co-axial with an axial bore in the plug itself. Further about ⅘ of the circumference can be used for the regulating groove.

For especially high efficiency in the regulation of the valve two or more plugs can be so connected one behind the other that, as shown in Figures 6 and 7, a stage-like leading over is possible of the fine regulation of one exit plug to the next plug. In Figures 6 and 7 the parts of the plug 14, 18, 19 and 21 corresponds with the parts of the inner plug 14a, 18a, 19a and 21a. In Figure 4 the medium flows through the bore hole 18 of the plug into the opening 19 provided in the wall of the plug 14, and then flows into the regulating groove 21 until it reaches the point 25 where the medium flows into the connecting tube 20. By using numbers (e. g. divisions into tenths) or by a combination of numbers and letters it is possible in a simple manner to determine and fix the setting required for the opening.

The delicate regulating valve is suitably so arranged that the lubricant 2 flowing from the tube 1 (Figure 1) reaches a point in the channel 6 (Figure 1), which is distanced as far as possible from the over-flow or passage 12. Hereby a constantly regular out-flow or over-flow is achieved.

In Figure 9 which shows diagrammatically the whole lubricating arrangement according to the invention, 26 is the storage tank for the lubricating material, which tank is capable of being heated in order to keep the viscosity of the lubricant constant, 27 is the central valve arrangement of the tank, from which several tubes for lubricant can be served, without it being necessary to alter the setting of the delicate regulating valves 13 which are supplied with lubricant by the tubes 28. The tank 26 may be provided with a measuring device 26a to determine the amount of oil in the tank. The lubricant passes down the tube 1 from which drops fall off in exactly measured quantities into the collecting channel 6 of the container 5 and flows from there in a constant thread through the outlet at the overflow opening in the channel, along the inner wall of the lubricating tubes 10 which lead to the matrices.

Attempts have already been made to feed the drops of lubricant in an unbroken stream. In Figure 8 is shown such a known arrangement. The drops falling on the sloping surface of the funnel are stemmed, as is shown in use, and make up, as Figure 8 shows, instead of an unbroken thread of oil, a chain of more or less large, loosely connected swellings, which then at a bend in the lubricating tube (according to the present example, to the right) again break up into drops, which fall singly onto the opposite inner wall and so stop up for a short time the gas conduit which still contains waste gases. The defective functioning of such an arrangement cannot be improved by the careful installation i. e. or the exact placing of the dropping tube over the funnel wall.

In order not to have to set the fine regulation afresh at each starting up of the machine, a main valve is built into the tube leading to the delicate regulating valve, which is closed when the machine is stopped, and opened when the machine starts up again, without it being necessary to shut off or set the fine regulation again. Such a main valve can at the same time serve several or all of the delicate regulating valves of the machine.

Having now particularly described and ascertained the nature of my said invention, and in what manner the same is to be performed, I declare that what I claim is:—

1. A process for lubricating hot parts in type-casting machines comprising the steps of regulably distributing a liquid lubricant in approximately equal quantities, temporarily collecting these quantities of liquid lubricant in a reservoir, conveying the liquid lubricant in a continuous stream from the reservoir to the inner wall of a pipe leading to the hot parts to be lubricated, allowing the liquid lubricant to flow down said inner wall to the hot part to be lubricated, allowing the vapours produced by the evaporation of said liquid lubricant on the hot parts to be lubricated to escape through said pipe line.

2. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir.

3. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir arranged concentrically to said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged eccentrically to said pipe line above said reservoir that the liquid lubricant can fall into said reservoir.

4. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir, curved parts in said pipe line, said inlet of the liquid lubricant into said pipe line so arranged and constructed that the liquid lubricant continuously flows away along the inner surface of said pipe line remote from the centre of curvature.

5. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir, a through pipe for the liquid lubricant in said valve plug for the purpose of being able to utilize said fine adjustment valve as a through valve.

6. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir, a second similar valve plug disposed in said valve plug for the purpose of improving the fine adjustment.

7. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir, a stop cock constructed in the pipe between said reservoir and said fine adjustment valve adapted to close said pipe without having to alter the fine adjustment of the fine adjustment valve.

8. Apparatus for lubricating hot parts in type-casting machines, comprising at least one heatable container for the liquid lubricant, a cut-off device on said container, at least one fine adjustment valve for the liquid lubricant, at least one pipe connecting said container with said fine adjustment valve, said fine adjustment valve being provided with a valve plug having a tapering channel therein, said channel being capable of insertion in varying lengths in said fine adjustment valve, at least one pipe line leading from outside to a part to be lubricated inside a type-casting machine, a reservoir at the outer end of said pipe line, an inlet into said pipe line for the liquid lubricant from said reservoir, said inlet being so arranged and constructed that the liquid lubricant can flow away along the inner wall surface of said pipe line, at least one discharge pipe on said fine adjustment valve, said discharge pipe so arranged above said reservoir that the liquid lubricant can fall into said reservoir, said reservoir constructed as a channel surrounding the end of said pipe line and provided with an annular wall, said annular wall provided with an opening, said opening serving as inlet for the liquid lubricant.

9. A feeding device for lubricating systems, comprising a collecting container for feeding the lubricant and having a collecting channel therein with a rim and an outlet in the rim, a lubricating tube leading from the container and in communication with the outlet, and means for feeding lubricant into the collecting channel.

10. A feeding device according to claim 9, in which the collecting channel is circular and the rim is concentrically arranged with respect to the channel and forms the end of the tube.

11. A feeding device according to claim 9, in which the tube has a bend therein and the outlet being arranged in the rim opposite to the direction of the bend.

12. A feeding device for lubricating systems, comprising a collecting container for feeding the lubricant and having a collecting channel therein with a rim and an outlet in the rim, and means for feeding lubricant into the channel which will leave said channel only at the outlet in the rim.

HANS OTTO HOFFMANN.